(12) United States Patent
Coccellato

(10) Patent No.: US 12,410,074 B1
(45) Date of Patent: Sep. 9, 2025

(54) RAIN WATER COLLECTION, FILTRATION, AND LIFE BOAT SYSTEM

(71) Applicant: Cannon Coccellato, Sherman Oaks, CA (US)

(72) Inventor: Cannon Coccellato, Sherman Oaks, CA (US)

(73) Assignee: INTERGALACTIC SERVICES 24/7, LLC, Sherman Oaks, CA (US)

(*) Notice: Subject to any disclaimer, the term of this patent is extended or adjusted under 35 U.S.C. 154(b) by 1 day.

(21) Appl. No.: 18/600,533

(22) Filed: Mar. 8, 2024

(51) Int. Cl.
| | | |
|---|---|---|
| B01D 29/56 | (2006.01) |
| B01D 29/05 | (2006.01) |
| B01D 29/62 | (2006.01) |
| B01D 35/30 | (2006.01) |
| B01D 61/58 | (2006.01) |
| B01D 65/02 | (2006.01) |
| C02F 1/00 | (2023.01) |
| C02F 1/44 | (2023.01) |
| C02F 103/00 | (2006.01) |

(52) U.S. Cl.
CPC ............... *C02F 1/44* (2013.01); *B01D 29/05* (2013.01); *B01D 29/56* (2013.01); *B01D 29/62* (2013.01); *B01D 35/306* (2013.01); *B01D 61/58* (2013.01); *B01D 65/02* (2013.01); *C02F 1/001* (2013.01); *B01D 2317/02* (2013.01); *C02F 2103/001* (2013.01); *C02F 2201/001* (2013.01); *C02F 2303/16* (2013.01)

(58) Field of Classification Search
CPC ........ B01D 29/05; B01D 29/56; B01D 29/62; B01D 35/306; B01D 36/04; B01D 61/58; B01D 65/02; B01D 2317/02; C02F 1/001; C02F 1/44; C02F 2103/001; C02F 2201/001; C02F 2303/16; E03B 3/02; E04D 2013/086

See application file for complete search history.

(56) References Cited

U.S. PATENT DOCUMENTS

| | | | |
|---|---|---|---|
| 516,968 | A * | 3/1894 | Gardner ................... B63C 9/06 |
| | | | 114/349 |
| 3,002,870 | A | 10/1961 | Belgrade et al. |
| 5,554,277 | A | 9/1996 | Rief et al. |
| 6,576,123 | B2 | 6/2003 | Priggemeyer et al. |
| 8,438,788 | B2 | 5/2013 | Bell et al. |

(Continued)

FOREIGN PATENT DOCUMENTS

| | | |
|---|---|---|
| CN | 210001674 | 1/2020 |
| CN | 110755923 | 2/2020 |

(Continued)

OTHER PUBLICATIONS

EP1034828A1—EPO Machine Translation (Year: 2024).*

*Primary Examiner* — Patrick Orme
(74) *Attorney, Agent, or Firm* — Trojan Law Offices

(57) ABSTRACT

The invention provides a rain water collection, filtration, and life boat system. The system comprises a rain catcher unit with a life boat having a water tank, and a connecting hose. The connecting hose connects the rain catcher to the water tank of the lifeboat to allow a flow of collected rain water from the rain catcher to the water tank. The connecting hose comprises a flexible tube and a plurality of liquid filters, wherein the plurality of liquid filters are positioned in predetermined distances from each other throughout the flexible tube.

14 Claims, 5 Drawing Sheets

(56) References Cited

U.S. PATENT DOCUMENTS

| | | |
|---|---|---|
| 8,663,465 B2 | 3/2014 | Harrison et al. |
| 9,243,386 B2 | 1/2016 | Perlatti |
| 9,568,211 B1 | 2/2017 | Wright et al. |
| 2004/0002270 A1 | 1/2004 | Courtney |
| 2010/0108617 A1 | 5/2010 | Schmidt et al. |
| 2010/0244339 A1 | 9/2010 | Yoon et al. |
| 2011/0005602 A1 | 1/2011 | Harrington |
| 2011/0024341 A1 | 2/2011 | Lyon |
| 2011/0100887 A1 | 5/2011 | Balistreri |
| 2011/0211976 A1* | 9/2011 | Magoon ................. B01D 65/10 417/53 |
| 2011/0232766 A1* | 9/2011 | Bell ........................ E04D 13/08 52/16 |
| 2020/0398204 A1* | 12/2020 | Vo ...................... B01D 46/0005 |

FOREIGN PATENT DOCUMENTS

| | | | |
|---|---|---|---|
| CN | 215630336 | 1/2022 | |
| EP | 1034828 A1 * | 9/2000 | ........... B01D 29/118 |
| KR | 10-0856883 | 9/2008 | |
| KR | 10-1344852 | 12/2013 | |
| WO | WO-2016111610 A1 * | 7/2016 | ............. B01D 61/18 |

* cited by examiner

RAIN WATER COLLECTION, FILTRATION, AND LIFE BOAT SYSTEM

FIELD OF THE INVENTION

The present invention relates to rain water collection systems, and in particular, to a rain water collection and filtration unit connected to a mobile water tank, wherein the water tank is capable of floating on water.

BACKGROUND

Due to the present water crisis in the world, the use of rain water harvesting systems is of great importance. According to a UNICEF document, titled Water Scarcity, four billion people, almost two thirds of the world's population, experience severe water scarcity for at least one month each year. The document further provides that over two billion people live in countries where water supply is inadequate, and half of the world's population could be living in areas facing water scarcity by as early as 2025.

Rain water harvesting systems are used worldwide. In such systems, rain water can be captured, filtered, and held for future use. The filtered water can be used as drinking water.

Various documents presently exist that describe arrangements relating to rainwater collection. For example, Harrison discloses a filtration and dispensing system that is particularly suitable for underdeveloped parts of the world is provided for storing, filtering, and dispensing rainwater, surface water, or groundwater, wherein the system includes a bank of ceramic filters, a water retention container for holding water to be dispensed by the system, and at least one header tank to which water supplied from the water retention container is fed. (Harrison et al., U.S. Pat. No. 8,663,465 B2).

It is an object of the present invention to provide a low cost and an easy to install rain water collection, filtration, and life boat system that can be used year round. The present invention serves an economical purpose during normal rainy seasons by allowing rainwater, which is usually absorbed into the ground or washed away, to be collected and filtered for human use and consumption. But the invention also serves a crucial lifesaving purpose in the event of a natural disaster, such that the buoyant water storage tank functions as a life raft with its own fresh water supply. The present rain water collection, filtration, and life boat system would be of great utility in parts of the world where water is scarce and/or seasonal flooding is an unfortunate part of life. In the event of a flood in rural India, for example, the elderly, young children, and/or pets who cannot swim can rest on the seating area of the life boat until the flood is over. Additional people can hang on to the safety ropes on the side of the storage tank/lifeboat to remain afloat without having to tread water indefinitely. All the while, fresh water, which is often in short supply after a natural disaster, would be readily available. Thus, the Water Kit has the potential to not only save money through harvesting rainwater for daily use, but to also save lives in the event of flooding following a natural disaster such as a hurricane, cyclone, typhoon, or tsunami.

SUMMARY

The present invention provides a rain water collection, filtration, and life boat system, the system comprising a rain water collection surface having an outlet opening, a life boat having a water tank, and a connecting hose. The water tank has an inlet opening. The connecting hose connects the outlet opening to the inlet opening. The connecting hose is configured to allow a flow of collected rain water from the rain water collection surface to the water tank. The connecting hose comprises a flexible tube and a plurality of liquid filters. The plurality of liquid filters are positioned in predetermined distances from each other throughout the flexible tube.

The plurality of liquid filters can be mesh screen filters or membrane filters. The plurality of liquid filters can be fitted into the interior of the connecting hose by a plurality of retention mechanisms. Each one of the plurality of retention mechanisms can be marked with a type indicator indicative of a type of a filter that can be fit into the interior of the connecting hose.

Each one of the retention mechanisms comprises a curved clamp to hold one of the plurality of liquid filters in place, and the curved clamp is configured to lock/unlock by a latch. The life boat can have a seating area.

The invention further provides a flexible hose for rain water filtration, comprising a flexible tube defining a liquid passageway between a first end and a second end, wherein the first end of the flexible tube defines a first opening that is connectable to a source of a liquid. The second end of the flexible tube defines a second opening that is connectable to a water tank. A plurality of liquid filters can be attached to the interior of the flexible hose between the first and second ends to filter undesired matters in the liquid through the hose. The plurality of liquid filters are positioned in predetermined distances from each other throughout the flexible tube. The plurality of liquid filters can be mesh screen filters or membrane filters.

The plurality of liquid filters are fitted into the interior of the flexible hose with a plurality of retention mechanisms. Each one of the retention mechanisms comprises a curved clamp, wherein the curved clamp holds one of the plurality of filters in place, and the curved clamp is configured to lock/unlock by a latch. Each one of the plurality of retention mechanisms can be marked with a type indicator indicative of a type of a filter that can be fit into the interior of the flexible hose. The flexible hose may further comprise a pair of male tracks positioned on opposite sides of the flexible tube. The plurality of liquid filters can be replaced by unlocking and locking the curved clamp.

The invention further provides a method of rain water collection and filtration, the method comprising the steps of collecting rain water with a collection surface, inserting a plurality of liquid filters into predetermined locations in a flexible connecting hose, and allowing the collected rain water to flow through the flexible connecting hose from the collection surface to a floatable water tank. The method may further comprise the steps of the determining an efficiency of the plurality of liquid filters, and replacing at least one of the plurality of the liquid filters based on the determined efficiency. The method may further comprise the steps of determining an efficiency of the plurality of liquid filters, removing at least one of the plurality of the liquid filters based on the determined efficiency, cleaning the at least one of the plurality of the liquid filters, inserting the at least one of the plurality of the liquid filters into the flexible connecting hose. In various implementations of the invention, the order of the steps of the method can be changed, and some steps can be performed simultaneously.

DESCRIPTION

The present invention is described more fully hereinafter, but not all embodiments are shown. While the invention has been described with reference to exemplary embodiments, it will be understood by those skilled in the art that various changes may be made, and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Common elements between different figures may retain the same numerical designation.

Figure 1:
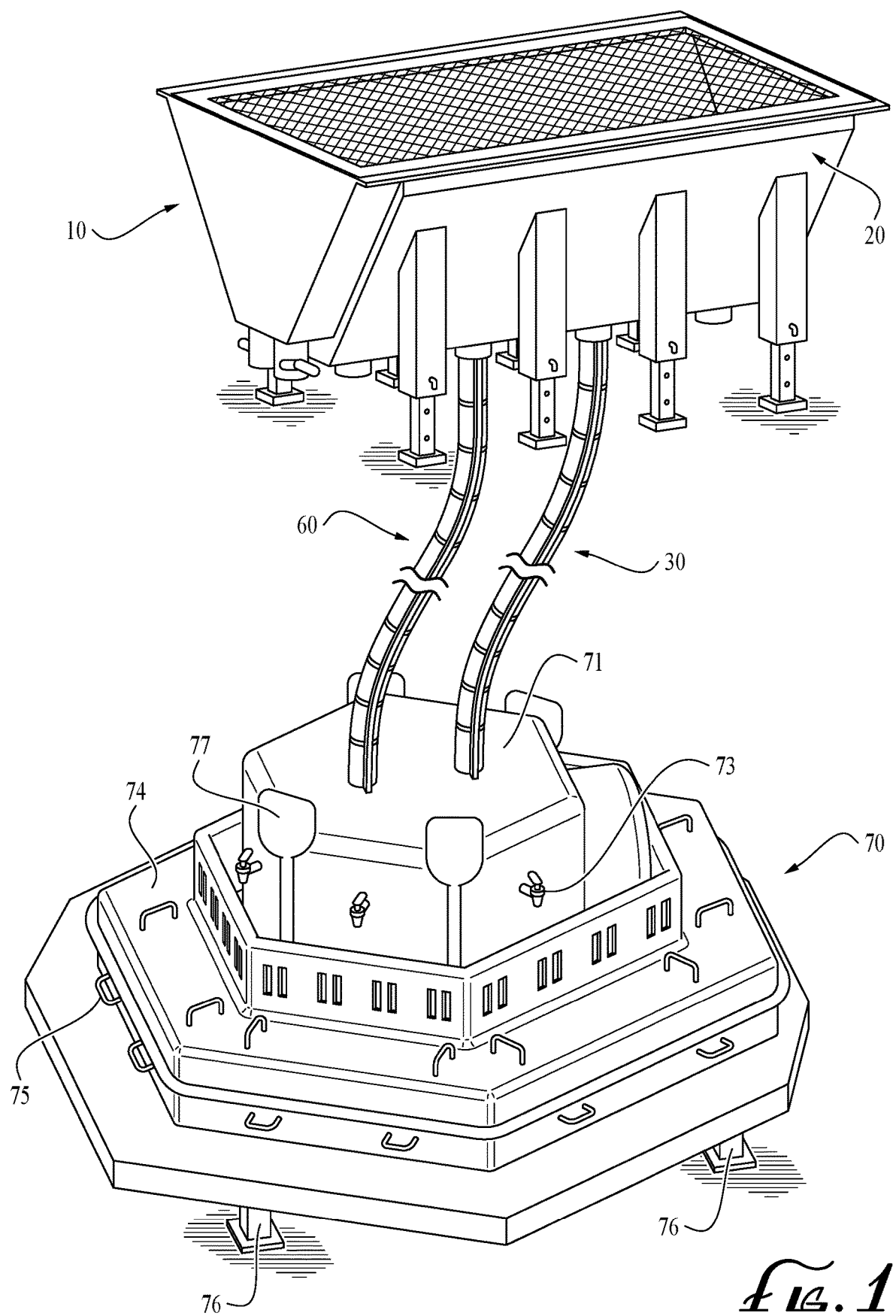
FIG. 1 illustrates a perspective view of a rain water collection, filtration, and life boat system.

Referring to FIG. 1, the figure illustrates a perspective view of a rain water collection, filtration, and life boat system, comprising a rain catcher 10, a stand 20, connecting hose(s) (30, 60), and a life boat 70. The rain catcher 10 can be positioned on the stand 20. The rain catcher 10 is adapted to collect the rain water through its top opening area. The collected rain water can be filtered through a plurality of filters positioned on the top and inside the rain catcher 10. The collected rain water can be further filtered by additional filters that are positioned inside the connecting hose(s). The connecting hose(s) (30, 60) connect outlet openings of the rain catcher 10 to inlet openings of the water tank 71 of the life boat 70. The collected rain flows through connecting hose(s) (30, 60) to the water tank 71. In its grounded position, the life boat 70 may be positioned on a plurality of legs 76. In its floating position, the connecting hose(s) can be adapted to be easily detached from the water tank 71. The connecting hose(s) can be connected to the water tank of a single life boat as shown in FIG. 1 or can be connected to a plurality of life boats.

Figure 2:
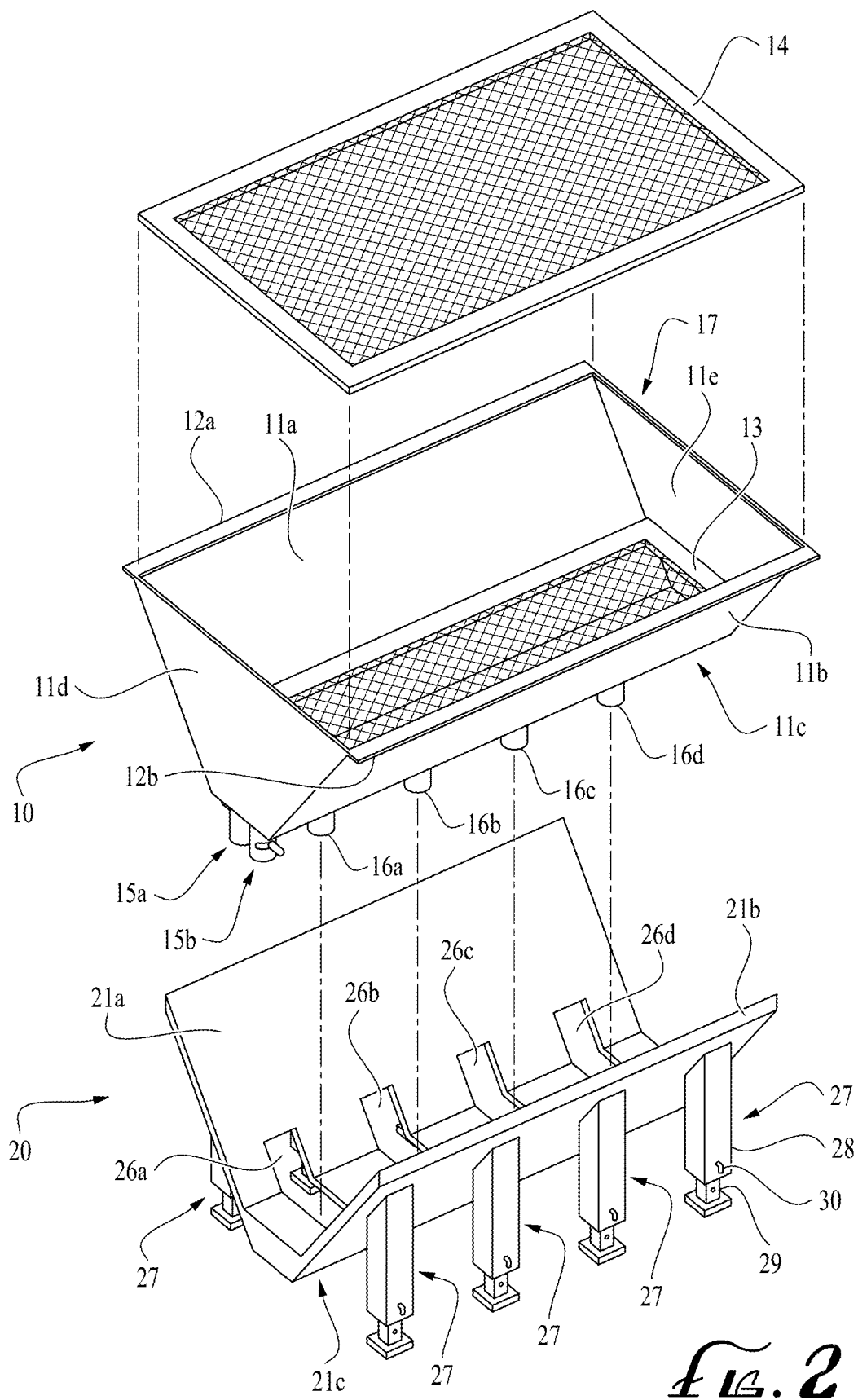
FIG. 2 illustrates a perspective view of a rain catcher and a stand for the rain catcher.

Referring to FIG. 2, the figure illustrates a perspective view of the rain catcher 10 and its stand 20. The rain catcher comprises side walls (11a, 11b, 11e, 11d), and a bottom surface 11c. A top opening 17 is formed on the top of the rain catcher 10, wherein the top opening 17 is formed between the top of the side walls (11a, 11b, 11e, 11d). The rain catcher 10 may further comprise a pair of lips (12a, 12b) for a lid (not shown) to slide over when the rain catcher is not in use. The rain catcher 10 catches the rain through its top opening 17. The rain catcher may further have a plurality of screen/mesh filters such as the top exterior filter 14 and the bottom interior filter 13, wherein the bottom interior filter is inserted through the top opening 17 to be placed inside the rain catcher 10, and the top exterior filter is positioned on the top or in proximity of the top of the rain catcher 10. The plurality of screen/mesh filters are used to separate fine particles and sand out of the collected water. The mesh/screen filters of the rain catcher 10 can be made of flexible or rigid materials. For example, the filter can be a non-rust, thick mesh filter that is placed on top of the rain catcher. The rain catcher 10 may further comprise a pair of spigots (15a, 15b) with flow control handles. In an embodiment of the invention, the rain catcher 10 is made from fiber-reinforced plastic (FRP) and polyethylene. The rain catcher 10 can be made in different sizes. In an implementation of the invention, the opening 17 can be a 4 ft by 8 ft opening.

Still referring to FIG. 2, the rain catcher 10 further comprises one or more outlet openings such as 16a, 16b, 16c, and 16d. The outlet openings can be female adapters to receive one end of the connecting hose(s) (not shown).

As shown in FIGS. 1-2, the rain catcher 10 can be positioned on a stand 20. The stand 20 may comprise side walls (21a, 21b) and a bottom surface 21c. The shape of the stand 20 conforms to the shape of the rain catcher 10 so the rain catcher 10 can fit inside the stand 20. The stand 20 further comprises holding legs 27. The holding legs 27 may have a height adjustment mechanism such as an affixing pin 30, a hollow beam 28 with first set of apertures, and a slide-in beam 29 with second set of apertures, wherein the affixing pin 30 can be inserted through one of the first set of apertures and one of the second set of apertures to adjust the height of one of the holding legs 27. A plurality of openings/cut-outs such as 26a, 26b, 26c, and 26d can be created at the bottom of the stand to allow for insertion of one or more outlet openings (such as 16a, 16b, 16c, and 16d) of the rain catcher 10 when is placed on the stand 20.

Figure 3:
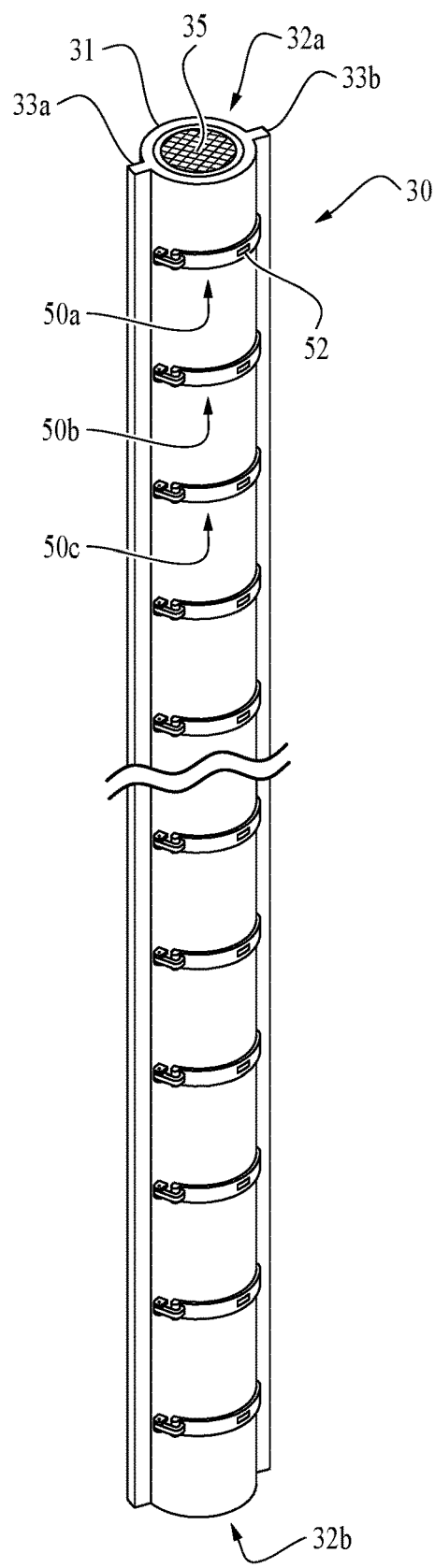
FIG. 3 illustrates a perspective view of a connecting hose.

Referring to FIG. 3, the figure illustrates a perspective view of the connecting hose 30. The connecting hose 30 comprises a flexible tube 31 defining a liquid passageway between a first end 32a and a second end 32b. The first end 32a of the flexible is connectable to a source of a liquid such as the rain catcher 10 as shown in FIG. 1. The second end of the flexible tube 31 is connectable to a water tank such as the one (71) shown in FIG. 1.

Figure 8:
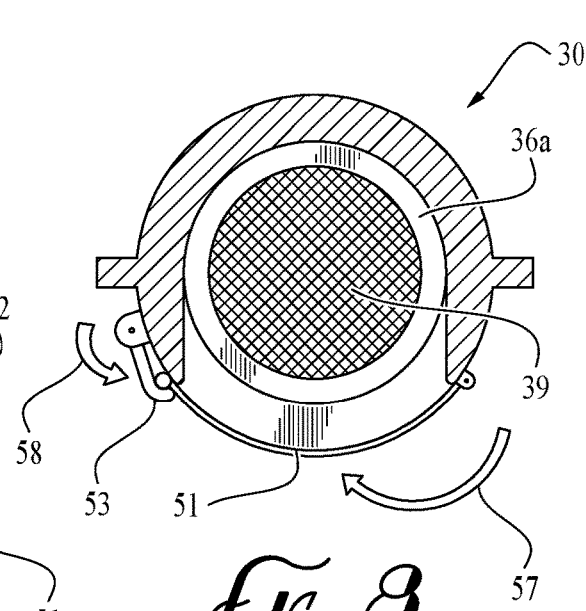
FIG. 8 illustrates a cross section view of the connecting hose wherein a filter is positioned within the connecting hose.

A plurality of retention mechanisms (such as 50a, 50b, and 50c) are coupled to the exterior of the connecting hose 30 in predetermined distances from each other. Each retention mechanism is capable of holding a liquid filter in place inside the connecting hose 30, such that the liquid flowing through the connecting hose is filtered multiple times by passing through multiple liquid filters. Each retention mechanism is adapted to receive a liquid filter such as a screen/mesh/membrane filter as shown in FIGS. 5 and 8 (filter 39). Therefore, a plurality of liquid filters (not shown) can be attached to the interior of the connecting hose 30 in predetermined distances from each other between the first end 32a and the second end 32b to filter undesired matters in the liquid passing through the connecting hose 30. The plurality of liquid filters can be membrane filters with various micron sizes, wherein the closest membrane filter to the first end 32a has the highest micron size, and the micro size of the membrane filters can gradually decrease throughout the connecting hose to a 1 micron size for the closest filter to the second end 32b. Additionally, a liquid filter 35 can be coupled to the first end 32a, and another liquid filter (not shown) can be coupled to the second end 32b. The connecting hose 30 may further comprise a plurality of elongated male tracks (such as 33a and 33b). The connecting hose 30 can either function by itself, or can be further covered by a protective female hose 40 as shown in FIG. 4.

In an embodiment of the invention, the outside of the connecting hose 30 may be made from a coating material coating such as fiber-reinforced plastic material (FRP), and the interior of the connecting hose can be made from polyethylene resin, green or black, to reduce algae growth.

Figure 4:
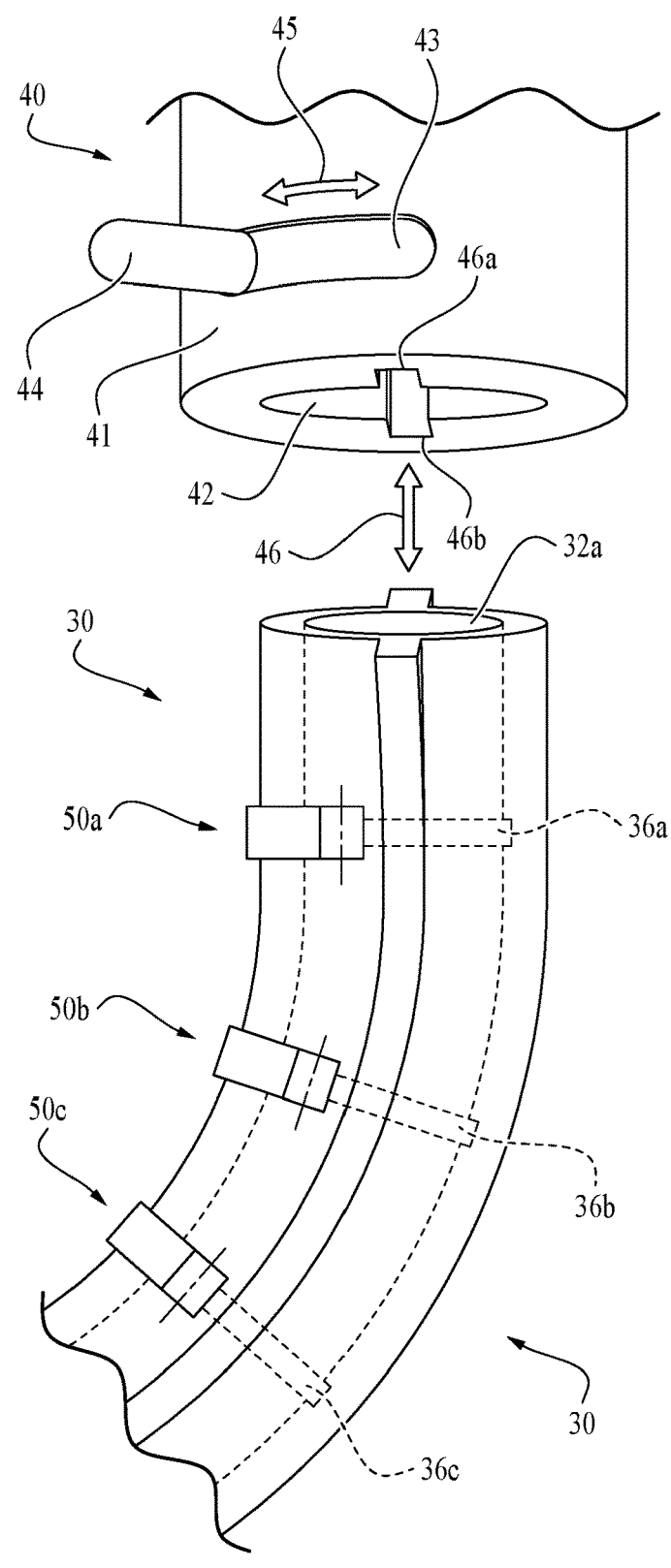
FIG. 4 illustrates a perspective view of a portion of the connecting hose, and a protective female hose.
Figure 5:
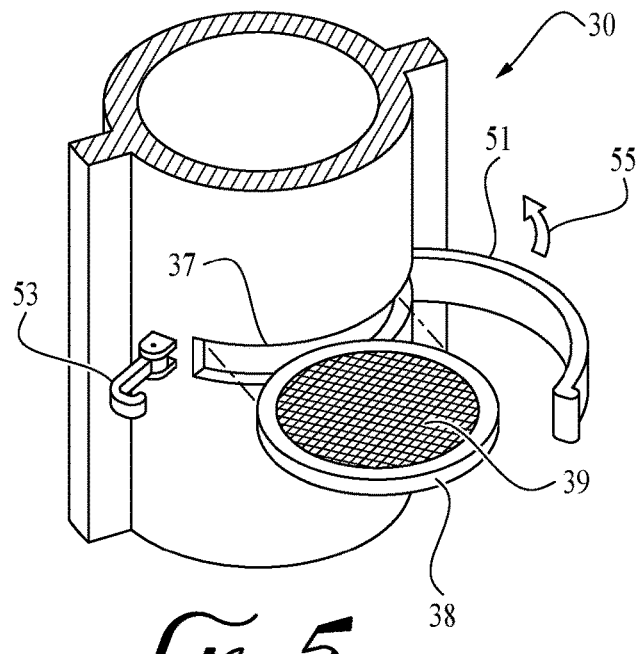
FIG. 5 illustrates a perspective view of a retention mechanism of the connecting hose in open position.

Referring to FIG. 4, the figure illustrates a perspective view of a portion of the connecting hose 30, and a protective female hose 40. As shown in the figure, the connecting hose 30 may further comprise a plurality of filter holders (such as 36a, 36b, 36c), wherein each one of the filter holders is adapted to receive a liquid filter. The plurality of retention mechanisms (such as 50a, 50b, and 50c) are coupled to the plurality of filter holders (such as 36a, 36b, 36c) respectively, wherein a filter (not shown) such as a screen/mesh filter can be placed within the each internal frame, and can be held in place by the corresponding retention mechanism.

Still referring to FIG. 4, the connecting hose 30 can slide inside a protective female hose 40, wherein the protective female hose 40 provides further strength or protection for the internal connecting hose. The protective female hose may have an elongated body 41, and a plurality of female tracks (such as a pair of female tracks 46a and 46b), where the opening 42 and interior of the protective female hose 40 can be adapted to receive the connecting hose 30. The female tracks (46a, 46b) can be adapted to receive the male tracks of the connecting hose 30. The protective female hose 40 may further have a plurality of opening (such as 43) with opening covers (such as 44). The opening cover 44 can be a sliding cover that can be moved in opposite directions 45 to provide access to the retention mechanism of the connecting hose that is positioned under the opening cover 44 on the connecting hose.

Figure 6:
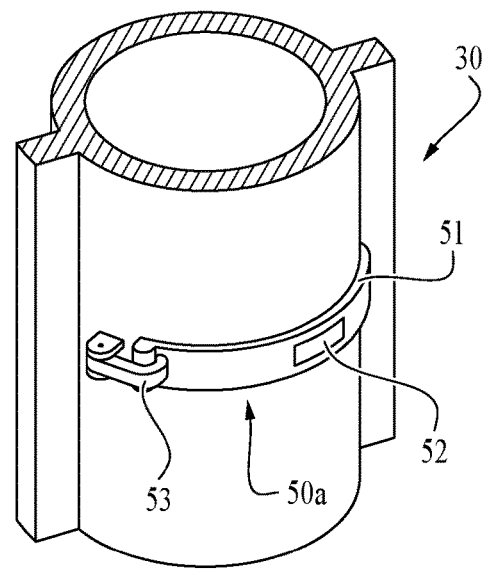
FIG. 6 illustrates a perspective view of the retention mechanism of the connecting hose in locked position.

Referring to FIGS. 5-6, the figures illustrate a perspective view of a retention mechanism 50a of the connecting hose 30 in unlocked position (FIG. 5) and locked position (FIG. 6). The retention mechanism (50a in FIG. 6) may comprise a clamp such as the curved clamp 51 and a watertight latch 53, wherein the curved clamp 51 and the latch 53 can be engaged/disengaged to provide a locking/unlocking mechanism for the retention mechanism. As shown in FIG. 5, the connecting hose comprises a filter insertion opening 37 which can be covered or uncovered by the clamp 51. When the retention mechanism is in unlocked position (FIG. 5), a liquid filter 39 can be inserted into the connecting hose 30 through the filter insertion opening 37, or can be removed therefrom. When the retention mechanism is in locked position (FIG. 6), the clamp 51 can hold a liquid filter in place inside the connecting hose 30. In a preferred embodiment of the invention, the retention mechanism is a watertight retention mechanism.

Still referring to FIGS. 5-6, in an implementation of the invention, a type indicator 52 can be marked in proximity of or on each retention mechanism (such as 50a as shown in FIG. 6) to indicate the type of the filter that can be held in place by the marked retention mechanism. For example, the exterior of the curved clamp 51 can be marked with a specific color or a code (52) indicative of the type of filter that can be used with the marked retention mechanism. Similarly, a type indicator can be marked on each liquid filter to indicate the type of the filter. The liquid filter (such as 39) can be a color-coated membrane wherein the color determines the micron size of the membrane filter. Various colors can be used to indicate various micron sizes. The liquid filter 39 can be a disk-shaped filter that is adapted to fit inside the connecting hose 30. The liquid filter 39 can be a framed membrane filter, wherein the filter is being held by a frame 38.

Figure 7:
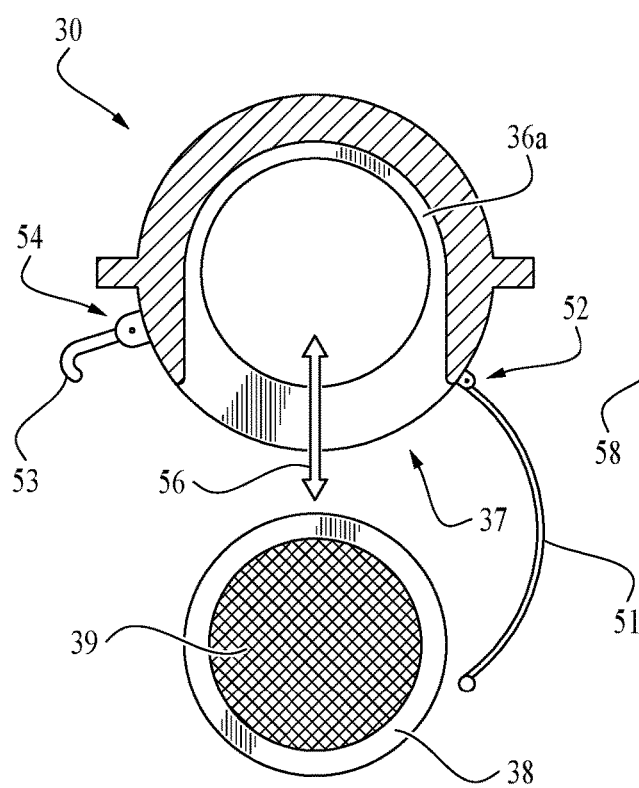
FIG. 7 illustrates a cross section view of the connecting hose wherein a filter can be inserted/removed via the retention mechanism.

Referring to FIG. 7, the figure illustrates a cross section view of the connecting hose 30 when the retention mechanism is in its unlocked/open position. When the retention mechanism is in unlocked position, the filter 39 can be inserted into or removed from the connecting hose 30 (see arrows 56) through the filter insertion opening 37. The connecting hose 30 may have a plurality of filter holders (such as 36a, 36b, 36c as shown in FIG. 4) for holding liquid filters. A representative filter holder 36a (as shown in FIG. 7) is adapted to receive the frame 38 of the liquid filter 39. As shown in FIG. 8, when the liquid filter 39 is positioned within the connecting hose 30, the retention mechanism (clamp 51 and the latch 53) can be locked (as shown by arrows 57 and 58) to hold the liquid filter in place inside the connecting hose.

Figure 9:
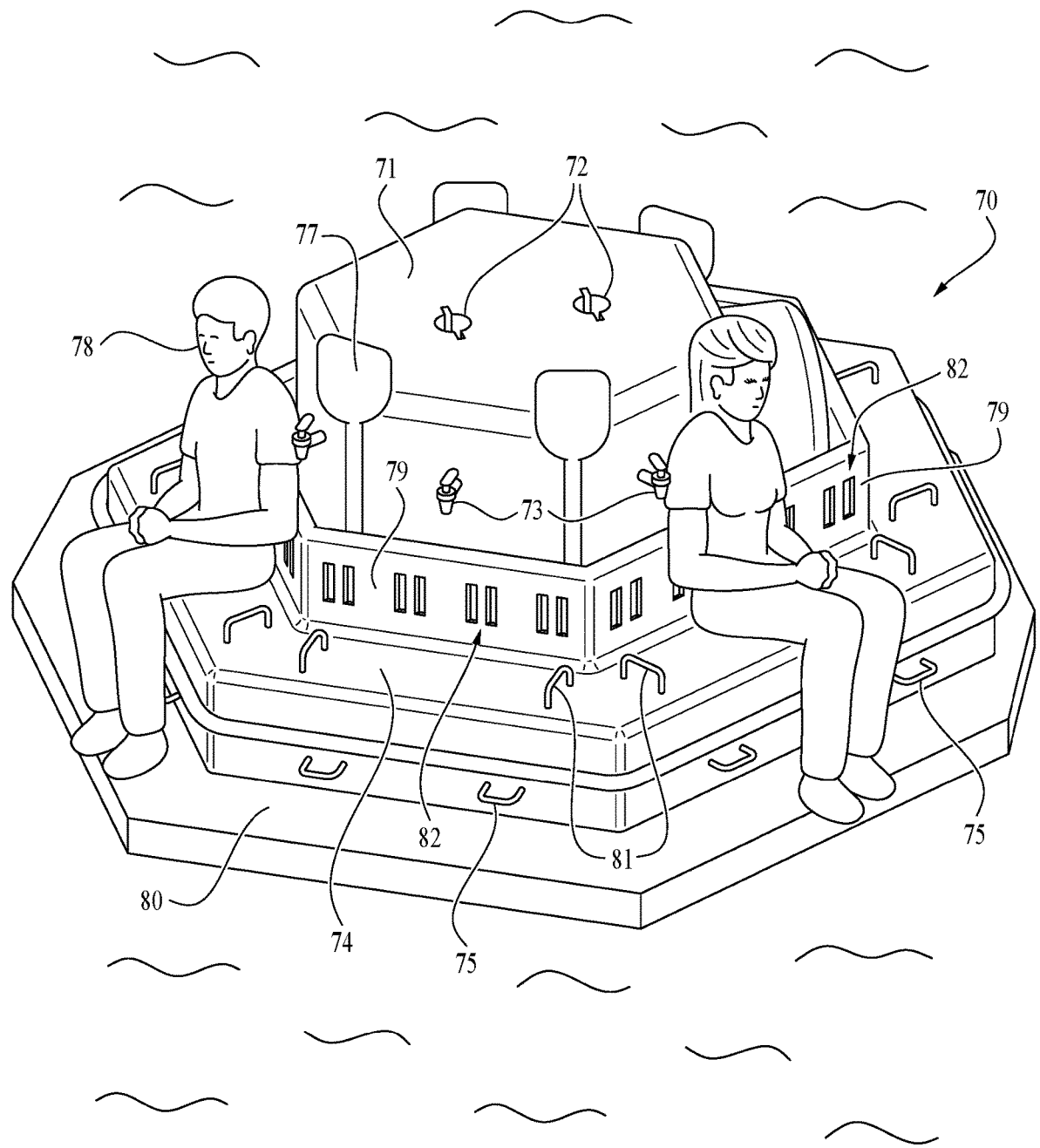
FIG. 9 illustrates a perspective view of a life boat having a water tank and a seating area.

Referring to FIG. 9, the figure illustrates a perspective view of a life boat 70 having a water tank 71, a seating area 74, backrest area 79, step 80, safety paddles 77, safety handles 75, seat handles 81, and backrest handles 82.

The water tank 71 may have a plurality of inlet openings 72 and a plurality of water dispensers 73. The inlet openings 72 are adapted to connect to the connecting hose (not shown). The inlet openings 72 may have female tracks to receive the male tracks of a connecting hose. The inlet opening can be a quick release valve capable of being easily detached from the connecting hose. As illustrated in FIG. 1, the connecting hose(s) (30, 60) connect the water tank 71 of the life boat 70 to the outlet openings of the rain catcher 10, to allow the collected rain water flow into the water tank 71. The water tank 71 may have additional filters (not shown) to enhance the quality of the drinking water.

As shown in an embodiment of the invention in FIG. 9, the seating area 74 can be a 360° seating area with the 360° backrest area 79. The safety paddles 77 can be attached to all sides of the life boat. The life boat 70 can further have a 360° step 80 at the base of the life boat, and a plurality of handles such as safety handles 75, seat handles 81, and backrest handles 82, wherein a person can grab onto the handles and climb up the step to reach the seating area. Handles can be cut-out handles such as the cut-out backrest handles 82.

The life boat can be made from fiber-reinforced plastic (FRP). In an implementation of the invention, a percentage or some parts of the life boat can be made from low-density polyethylene (LDPE), high-density polyethylene (HDPE), and/or Polypropylene (PP). In another implementation of the invention, a percentage or some parts of the life boat can be made from recycled low-density polyethylene (LDPE), recycled high-density polyethylene (HDPE), and/or recycled Polypropylene (PP) to help recycle the plastic on the planet.

The invention serves a crucial lifesaving purpose in the event of a natural disaster, such that the life boat 70 with its own water supply/tank 71. The present rain water collection, filtration, and life boat system would be of great utility in parts of the world where water is scarce and/or seasonal flooding is an unfortunate part of life. In the event of a flood, the people (78) in need can sit on the seating area 74 of the lifeboat 70 until the flood is over. Additional people can hang on to the handles on the side of the lifeboat 70 (such as the safety handles 75) to remain afloat. All the while, fresh water, which is often in short supply after a natural disaster, would be readily available through water dispensers 73 which are connected to the water tank 71. Thus, the invention has the potential to not only save money through harvesting rainwater for daily use, but to also save lives in the event of flooding following a natural disaster such as a hurricane, cyclone, typhoon, or tsunami.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claim.

What is claimed is:

1. A flexible hose for rain water filtration, comprising:
a flexible tube defining a liquid passageway between a first end and a second end;
the first end of the flexible tube defining a first opening connectable to a source of a liquid;
the second end of the flexible tube defining a second opening connectable to a water tank;
a plurality of filter insertion openings positioned in predetermined distances from each other along the flexible tube, each comprising a passageway into and out of the side of the flexible tube; and
a plurality of liquid filters, each configured to be inserted cross-sectionally from outside the flexible tube through one of the plurality of filter insertion openings and into the flexible tube, thereby positioning each of the plurality of liquid filters at a predetermined distance from each other along the length of the flexible tube; and
a plurality of retention mechanisms configured to individually cover each filter insertion opening, each retention mechanism comprising a clamp and a watertight latch, each retention mechanism configured to cover one of the plurality of filter insertion openings, such that each of the plurality of retention mechanisms can secure a filter in the flexible tube and create a watertight seal with the flexible tube.

2. The flexible hose of claim 1, further comprising a first-end liquid filter and a second-end liquid filter, the first-end liquid filter is coupled to the first end of the flexible tube, and the second-end liquid filter is coupled to the second end of the flexible tube.

3. The flexible hose of claim 1, wherein the plurality of liquid filters comprises mesh screens.

4. The flexible hose of claim 1, wherein the plurality of liquid filters comprises membrane filters with various micron sizes, wherein one of the membrane filters that is closest to the first end has the highest micron size.

5. The flexible hose of claim 1, wherein each of the clamps comprises a curved clamp holding one of the plurality of liquid filters in place, and wherein each curved clamp is configured to be releasably lockable by a corresponding watertight latch.

6. The flexible hose of claim 5, wherein each of the plurality of liquid filters is configured to be replaced by unlocking and locking the curved clamp.

7. The flexible hose of claim 1, wherein each one of the filter insertion openings is slot-shaped.

8. The flexible hose of claim 1, wherein the flexible hose further comprises a pair of male tracks positioned on opposite sides of the flexible tube.

9. A rain water collection, filtration, and life boat system, the system comprising:
a rain water catcher having side walls, a bottom surface, an open top and at least one outlet opening;
an adjustable height stand for holding the rain water catcher;
a life boat having a water tank, the water tank having an inlet opening;
a connecting hose, the connecting hose connecting the outlet opening to the inlet opening, the connecting hose configured to allow a flow of collected rain water from the rain water catcher to the water tank;
the connecting hose comprising a flexible tube with a plurality of filter insertion openings, each comprising a passageway into and out of the side of the flexible tube, a plurality of liquid filters, each configured to be inserted cross-sectionally from outside the flexible tube through one of the filter insertion openings into the flexible tube, thereby positioning each of the plurality of liquid filters at a predetermined distance along the length of the flexible tube; and
a plurality of watertight retention mechanisms, each retention mechanism configured to cover one of the plurality of filter insertion openings, such that each of the plurality of retention mechanisms can secure a filter in place in the flexible tube.

10. The rain water collection, filtration, and life boat system of claim 9, wherein the plurality of liquid filters each comprise a mesh screen.

11. The rain water collection, filtration, and life boat system of claim 9, wherein the plurality of liquid filters comprises membrane filters.

12. The flexible hose of claim 9, wherein each of the plurality of retention mechanisms is marked with a type indicator indicative of a type of filter that fits into the interior of the connecting hose.

13. The rain water collection, filtration, and life boat system of claim 9, wherein each one of the retention mechanisms comprises a curved clamp to hold one of the plurality of liquid filters in place, and the curved clamp is configured to be releasably lockable with a latch.

14. The rain water collection, filtration, and life boat system of claim 9, the life boat further having a seating area.

* * * * *